Patented Oct. 14, 1930

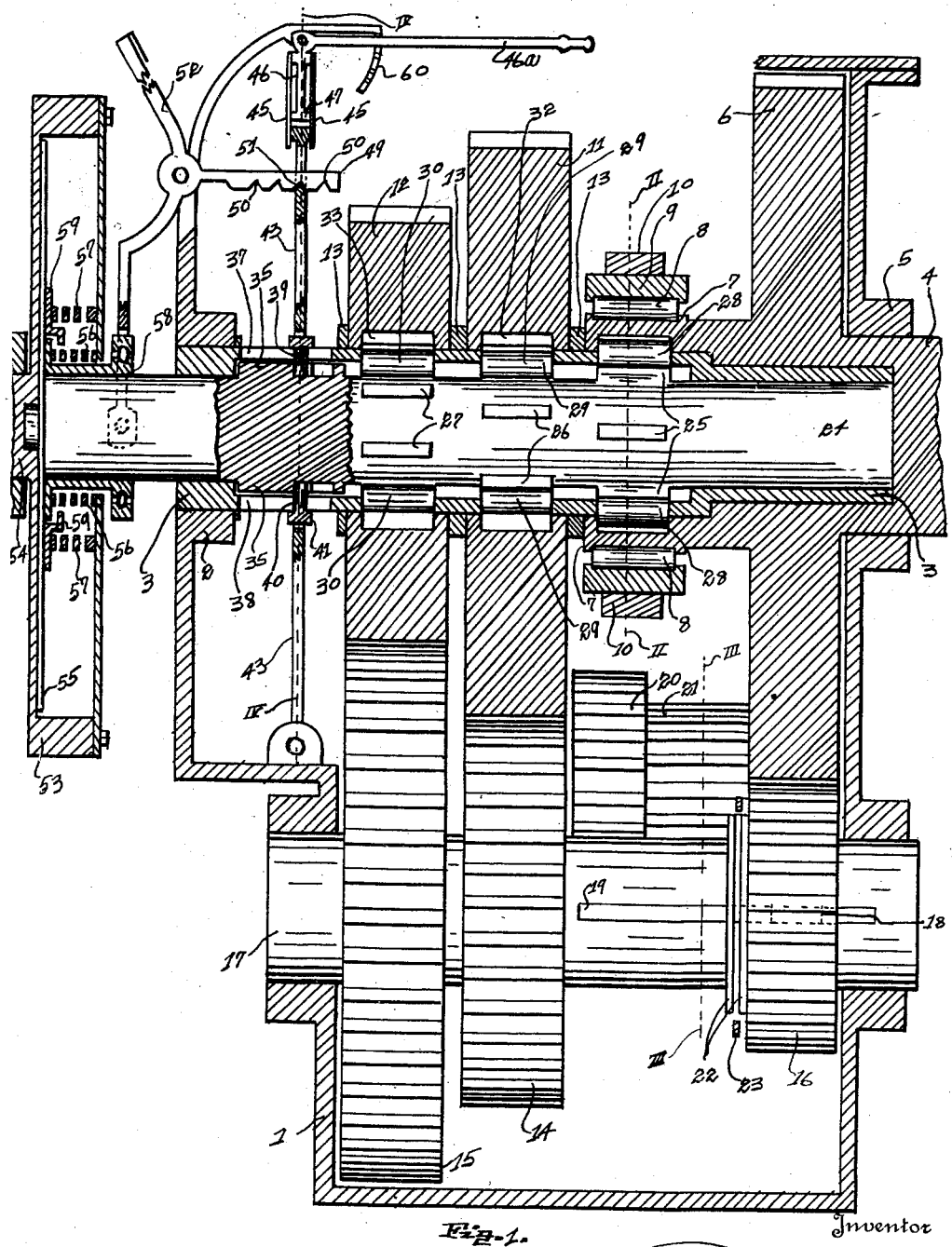

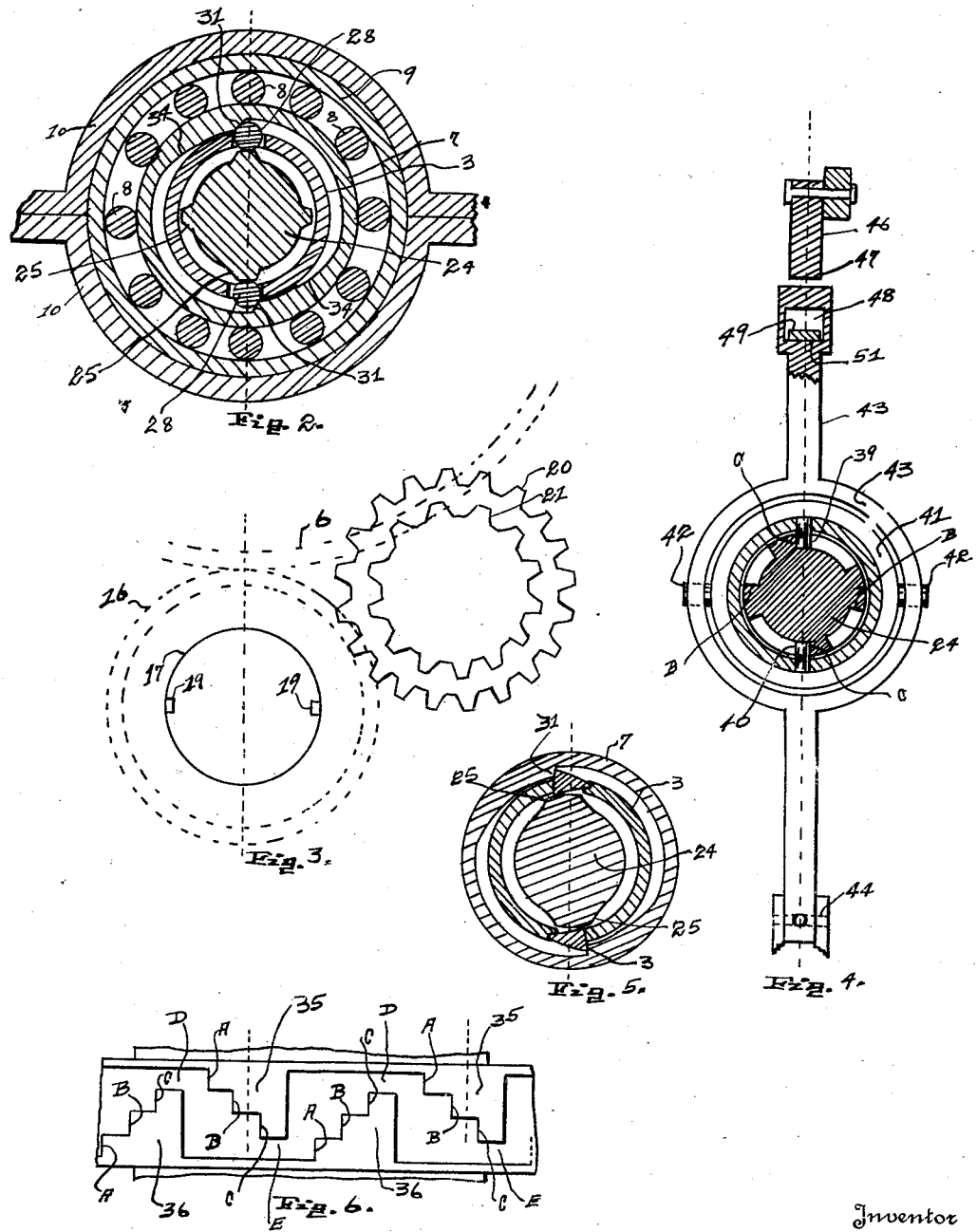

1,778,604

UNITED STATES PATENT OFFICE

ADOLPHE C. PETERSON, OF MINNEAPOLIS, MINNESOTA

AUTOMOTIVE SELF-ACTUATED VARIABLE TRANSMISSION

Application filed November 11, 1927. Serial No. 232,615.

My invention relates to transmission means used particularly in connection with automotive vehicles and to a simple self actuated type of variable transmission, wherefore it is called automotive self-actuated variable transmission.

The principle objects of my invention are to provide a transmission means of the variable type which shall be simple in construction, cheap in manufacture, durable in use, and simple in control. An object of my invention is to provide a variable transmission means particularly adaptable to use in automotive vehicles which shall be easily controlled, which shall be as to the principal function self-actuated, which shall be of such type that it may be readily applied to use in the transmission line of automotive vehicles, which shall be preselective, which shall be quick in action, which shall enable an inexperienced operator to make transmission changes under any conditions of service rapidly and without difficulty, and which shall in general be an improved simple form of variable transmission means.

In the accompanying drawings which illustrate my invention like characters refer to like parts throughout the several views. The principal devices and combinations of devices comprising my invention are as hereinafter described and as defined in the claims.

Referring to the drawings:

Figure 1 is a view in vertical section through the axis of the principal transmission shafts of my device and through the axis of a related clutch and engine crank shaft, this view showing some parts in full side elevation.

Figure 2 is a view in vertical section on the line II—II of Figure 1 this view being a section through the direct drive engagement means. It is noted that a section through the engagement of either of the lower drive gears will be, as to the engagement means substantially similar.

Figure 3 a section on a vertical plane on line III—III of Figure 1, through the reverse idler or gears and showing diagrammatically the relation of the gears with which the reverse gears cooperate under the reverse drive.

Figure 4 is a section on the line IV—IV of Figure 1 showing the transverse section of the control means.

Figure 5 is a section similar to that of Figure 2 showing a modified form of engagement means.

Figure 6 is a protracted view of the exterior face of the cam drive shaft at location of the control steps.

Referring again to the drawings, the numeral 1 indicates a transmission case wherein are revolvably mounted the principal driving elements of my device. On a horizontal axis in the upper part of the transmission case there is revolvably mounted by a bearing 2 at its forward end a main shaft 3 which latter is of tubular construction as shown except at its rear end which is solid as shown and is revolvable within a driven or propeller shaft 4 as a bearing. The driven shaft 4 is revolvably mounted in the bearing 5 and has formed integrally with it or secured to it a relatively large spur gear 6 and immediately in front of the spur gear 6 a direct drive drum or bell 7. The direct drive drum 7 is revolvably mounted in rollers 8 as a bearing the rollers being mounted within the outer race 9 the latter secured or fixed in brackets 10.

The main shaft 3 has forwardly of the direct drive drum 7 in order an intermediate drive spur gear 11 and a low drive spur gear 12 each of which is revolvably mounted upon the main shaft 3 as a bearing, collars 13 being provided between the spur gears to separate the gears and keep them retained in their relative positions. The collars may be shrunk on the main shaft or otherwise secured to the main shaft. (It is to be noted here that the spur gears 11 and 12 may be mounted by ball or roller bearings on the main shaft or in bearings in the transmission casing instead.)

The intermediate drive spur gear 11 has constant engagement with a spur gear 14 and the low drive spur gear 12 has constant engagement with a spur gear 15 and the spur gear 6 has constant engagement with a shiftable spur gear 16. The spur gears 14, 15 and 16 are all mounted on a secondary shaft 17 as an axis, the spur gears 14, 15 being fixed to the secondary shaft to revolve constantly with it and the shiftable spur gear 16 being shiftable axially on the secondary shaft 17 but revolvable permanently with the secondary shaft through a key 18 slidable axially in the key-way 19. The shiftable spur gear 16 in one position, that shown in Figure 1 engages the spur gear 6 directly and in its other position may be engaged with a reverse idler 20 the latter being fixed to drive a smaller spur gear 21 and through the latter to drive the spur gear 6 for reverse driving.

The shiftable spur gear 16 has collars 22 whereby it may be shifted by a yoke lever 23, manually.

The main shaft 3 has revolvably mounted in it as a bearing, the bearing surfaces being at the forward and rear ends of the main shaft, a cam drive shaft 24. The cam drive shaft 24 has related to the direct drive drum 7 four cams 25, and has related to the intermediate drive spur gear 11, four cams 26, and related to the low drive spur gear 12 four cams 27. The cams of each pair of cams as described, are diametrically located on the exterior surface of the cam drive shaft 24, the four cams 25 in the plane of the direct drive drum 7, the four cams 26 in the plane of the intermediate drive spur gear and the four cams 27 in the plane of the low drive spur gear 12. The direct drive drum 7 has related to it two engagement rollers 28 located in the plane of the drum in slots as shown in the main shaft 3. The intermediate drive spur gear 11 has related to it two engagement rollers 29 located in the plane of the intermediate drive spur gear, and the low drive spur gear 12 has related to it two engagement rollers 30 in the plane of the low drive spur gear 12. The engagement rollers are each located in slots as shown in the main shaft and are relatively fixed therein except that each roller, under the control action hereinafter described, may move radially outward or inwardly a limited distance.

The direct drive drum 7 has interior ratchet drive teeth 31, the intermediate drive spur gear 11 has interior ratchet drive teeth 32, and the low drive spur gear 12 has interior ratchet drive teeth 33, there being two ratchet drive teeth in each drive. The ratchet drive teeth are so formed that they have positive engagement against the rollers related (when elevated or protruded radially) on one side and on the opposite sides the ratchet drive teeth have inclined approaches 34, as shown, in order that when the respective direct drive drum, intermediate drive spur gear or low drive spur gear runs forwardly faster than the main shaft 3, the tendency will be for the ratchet drive teeth to force the related rollers radially inwardly or not to be engaged by the rollers. The cam drive shaft 24 in the plane of the various cams has a diameter (except as broken by the cams) somewhat less than the circle circumscribing the cams, that is so that the face of cam drive shaft 24 in the respective engagement planes when the cams are not in their engagement position directly radially within the related rollers, will permit the engagement rollers to move radially inwardly so that no part of the engagement rollers then protrude without the circle circumscribed by the exterior face of the main shaft 3, and so that therefore under such conditions there will be no engagement of such engagement rollers with the related direct drive drum or gears.

The cam drive shaft 24, although revolvable in the main shaft 3 as a bearing, is not constantly revolvable relative thereto, but only by progressive steps under the control action of two pairs of control steps 35 and 36 respectively. Each pair of control steps has one set of steps on one side and the other on the other side of the cam drive shaft so that the two control step sets of each pair are diametrically located oppositely on the cam drive shaft near its forward end. Each control step set of each pair has three steps. The steps in each set of each pair of control steps are denoted accordingly to their control function as A, B, C, A step of each set in each pair being related to low drive engagement, B step of each set in each pair being related to intermediate drive engagement and C step of each set in each pair being related to direct drive engagement. The steps A, B, C of each set in each pair are located progressively on the side of the cam drive shaft, advancing forwardly around the cam drive shaft 24. The steps are shown in their relative location by Figure 6 which is a protracted view of the exterior face of the cam drive shaft at the location of the control steps. The face of the cam drive shaft is recessed to form the steps as shown. There are so-called advance passages D and E cut also in the cam drive shaft in the relation shown.

The main shaft 3 has located diametrically oppositely in its sides near its forward end two slots 37, 38 running axially or parallel to the axis of the main shaft and within each of these two slots are slidably located one of two control lugs or posts 39, 40. These control lugs 39, 40 are fixed in or formed integrally with a sleeve 41 projecting inwardly from the sleeve, and they project such a distance that they remain permanently in the passages formed by the control steps and passages D, E in the cam drive shaft, being shiftable therein however. The sleeve 41 has pins 42 fixed with it on the outer circumference, the pins 42 being trunnioned in a control yoke 43, the latter pivotally mounted on its lower end on pivot 44 and being at its upper end engageable on its opposite sides by two strong leaf springs 45. The leaf springs 45 are fixed at their upper ends to opposite sides of a control lever 46 and on their lower ends are limited in their movement by the limiting block 47 of the control lever 46; the action being such that the two leaf springs will always tend to move against the limiting block 47 between them but that either may be individually forced away. The upper end of the control yoke normally locates itself by the action of the leaf springs directly intermediate of the leaf springs as they are limited by the limiting block 47, the springs tending to move the control yoke in either direction according to the location of the limiting block 47 by its control lever out of its middle or normal position.

There is a slot 48 in the upper end of the control yoke and in this slot a release lever 49 is located, the latter having notches 50 on its under side, the notches having such inclined sides that they will tend to locate the knife edge 51 of the control yoke between the sides of the notch. The notches are so positioned that they will locate the control yoke in the position of engagement of the control lugs 39, 40 in position for engagement with either A steps or B steps or C steps according to the control position of the control lever. The release lever 49 is liftable by clutch lever 52 as the latter is depressed for disengagement of the clutch. The clutch is formed by flywheel 53 on engine crank shaft 54 and clutch disk 55, the latter being pressed in engagement normally by high pressure spring 56 and low pressure spring 57. The clutch sleeve 58 when moved rearwardly first compresses high pressure spring 56 out of engagement and then in further movement rearwardly compresses low pressure spring 57 by means of collar 59 out of engagement, so that in first declutching action clutch disk is relieved of majority of pressure and in last action is relieved of the remainder of the engagement pressure of the springs 56, 57. The release lever does not lift sufficiently to release the control yoke until the high pressure spring 56 is compressed out of engagement or pressure against the clutch disk, but immediately thereupon before the low pressure spring is disengaged the control yoke is released. Further depression of the clutch pedal lever 52 entirely relieves the clutch disk of driving pressure, of the springs. The release lever notches may have sufficient depth to permit of the requisite action or the release lever may be separately constructed but acted upon by the clutch pedal lever 52 so as to accomplish the requisite action. The control lever 46 may be stationed by its handle and sector 60 in either control position. The control lugs and the cooperating steps must be of such size and strength that they will take the driving torque of the engine upon the propeller or driven shaft, as further transmitted through either of the sets of engagement rollers.

In the use or operation of my device, the operator places the shiftable spur gear 16 in either forward or rear position according to whether he desires reverse or forward driving action of the driven shaft. In the illustrations the engine crank shaft and the main shaft are driven in the anti-clockwise direction looking from the left of Figure 1. If the engine crank shaft is not driven by the related engine (not shown) the operator before permitting the clutch pedal lever 52 to elevate engaging the engine clutch, places control lever 46 in position for any driving speed he desires, direct, intermediate or low drive, and the clutch being disengaged, the leaf springs will then force the control yoke into the position whereby the control lugs are slid axially to the position of engagement of the desired control steps, and the clutch being then engaged the engine crank shaft, through the clutch drives forwardly (anti-clockwisely from left) the cam drive shaft 24 and the control steps predetermined engage the control lugs and thereby the cams related to the selected drive are brought by the torque of the engine into position just radially within their related engagement rollers and when the cam drive shaft has been so much revolved the latter is blocked against further revolution relatively to main shaft by the control steps and the related engagement rollers being protruded by the related cams the engagement rollers thus selected engage the ratchet drive teeth related and thus the selected drive is engaged.

In the process of engagement the inclined approaches of the cams will gradually extrude the engagement rollers selected but they will not be permitted to extrude or the cam drive shaft to sufficiently progress in its advancement until ratchet drive teeth related are in the correct position for final complete engagement. If the unit selected to be engaged or driven is revolving faster than the engine crank shaft then the cam drive shaft will not catch up to its control step selected until the engine speed becomes uniform with or so that torque is exerted. In fact this may under some constructions preferably be omitted in order that whenever the driven shaft is speeding faster than the engine the control lugs may fall back to a position of engagement of the low drive whereby braking action of the engine would then be provided. The cams for low drive may have such relative length that this is accomplished. The cams are of such length that at no time do the pairs of cams related to two drives come radially beneath their drives, their being sufficient distance circumferentially between the pairs or sets of cams.

By depressing clutch pedal lever 52 to disengage the high pressure clutch spring the operator provides a slipping action in the clutch giving light torque to cam drive shaft 24 and if the operator has then or then relocates control lever 46 the control lugs then slip to their new position of control and then the cam drive shaft will be permitted to advance to a new control position. In extreme forward or rear position control yoke provides low drive engagement, next position either forwardly or rearwardly provides intermediate drive and next position either forwardly or rearwardly provides direct drive engagement, and in next position either forwardly or rearwardly the control lugs slide through the passages D or E to the low drive control step of the other pair of control steps. The control lever or springs may be otherwise controlled as by a rotatable shaft.

It is to be noted that the ratchet teeth may have on each side or on each approach positive engagement similar to that on the one side as shown in order that under circumstances when the propeller shaft or driven gear runs faster than the drive shaft or engine crank shaft there will be no binding but the approaches in any case should be so formed as to obviate any binding. A duplicate pair of ratchet teeth, rollers and cam control may be provided in the low speed gears for braking effect but it is contemplated that this may if desired be secured in the construtcion shown and particularly so if the ratchet teeth approaches are formed with this in mind. The step control is such that under any circumstances whenever the cam shaft is not driven forwardly at a speed or torque to create driving between or from the cam shaft, the control lugs may fall back (there being no ratchet preventing reverse movement relatively) until the cam shaft is in the relative position whereby the cams related to low speed engagement are in the active or engaging position. The control lever 46 may oscillate on a pivot which is substantially the same as the pivot of the control yoke although it is shown otherwise for simplicity in the illustration only. While four cams are shown in each plane of engagment, only two or one, but two preferably need be provided, the control steps being modified accordingly. It is particularly to be noted that I show the device in its most simplest form for illustration and that other detailed devices may be used or other detailed combinations may be used in the realization of my invention. Particularly the device may embody a ratchet device as a roller or ball ratchet preventing backward movement relatively of the camshaft 24 relative to the main shaft 3.

What I claim is:

1. In a variable transmission means, a driving element and a driven element, transmission sets each having engagement means, and adapted to transmit drive between the driving element and the driven element, a control unit axially within the transmission elements and adaptable to cause engagement by radial displacement of any engagement means and movable by relative action between transmission elements, supplementary control means determining the movement of the control unit in stages, clutch means between the transmission and a related engine, clutch control means and locking means correlated to the clutch control means locking the control unit against relative movement during full engagement of the clutch means.

2. In a variable transmission means, a driving element and a driven element, transmission sets each having engagement means, and adapted to transmit drive between the driving element and the driven element, a control unit axially within the transmission elements and adaptable to cause engagement by radial displacement of any engagement means and movable by relative action between transmission elements, supplementary control means determining the movement of the control unit in stages progressively, clutch means between the transmission and a related engine, clutch control means and locking means correlated to the clutch control means locking the control unit against relative movement during full engagement of the clutch means.

3. In a variable transmission, transmission sets each having engagement means, a drive shaft, a driven shaft, a control unit axially within the transmission elements and adaptable to engage either transmission set under movement relatively in the transmission by radial displacement of individual engagement means, means whereby the control unit is impelled relatively of a transmission element, supplementary control means permitting the control unit to move to successive stages as controlled, clutch means between the transmission and a related engine, clutch control means and locking means locking the control unit against relative movement during full engagement of the clutch means.

4. In a variable transmission, transmission sets each having clutch engagement means, a drive shaft, a driven shaft, a control unit having integral movement with the drive shaft, and adaptable to engage either transmission set by its clutch engagement means under movement relatively in the transmission and radial displacement of clutch engagement means, and supplementary control means forming clutching means between the drive shaft and transmission and limiting also the movement of the control unit relatively according to the position of the supplementary control means.

5. In a variable transmission means, a drive element and a driven element, transmission sets each adapted to transmit drive between the drive element and the driven element, clutch elements individually related to each transmission set, a control unit adapted to be rotated by the drive element and adapted in individual relative positions to cause by radial displacement, engagement by an individual element of a transmission set in the drive on rotation by the drive element, and a locating unit adapted to determine the relative position of the control unit.

6. In a variable transmission means, a drive element and a driven element, transmission elements each adapted to constitute a driving element between the drive element and the driven element, clutch elements individually related to a transmission element, a control unit adapted to receive driving torque from the drive element, and adapted in individual relative positions to cause by radial displacement engagement by an individual clutch element of a transmission element in the drive between the drive element and the driven element, and a locating unit adapted to determine the relative position of the control unit.

7. In a variable transmission means, a drive element and a driven element, transmission elements each adapted to constitute a driving element between the drive element and a driven element, clutch elements individually related to a transmission element, a control unit adapted to receive driving torque from the drive element and adapted in individual positions in its relative rotation to cause by radial displacement engagement by an individual clutch element of a transmission element in the drive between the drive element and the driven element, and a locating unit adapted to determine the relative rotation and engagement caused by the control unit.

8. In a variable transmission means, a drive element and a driven element, transmission elements each adapted to constitute a driving element between the drive element and a driven element, clutch elements individually related to a transmission element, a control unit adapted to receive torque and adapted in individual positions of its relative rotation to cause by radial displacement, engagement by an individual element of a transmission element in the drive between the drive element and the driven element, and a locating unit adapted to determine the relative rotation and engagement caused by the control unit.

9. In a variable transmission means, a drive element and a driven element, transmission elements each adapted to constitute a driving element between the drive element and a driven element and each having related individually to it a clutch engagement means, a control unit adapted to receive torque and adapted in individual positions relatively to cause by radial displacement engagement by a clutch engagement means of a transmission element in the drive between the drive element and the driven element, and a locating unit adapted to determine the relative position of the control unit and the engagement caused by the control unit.

10. In a variable transmission means, transmission elements each adapted to constitute a driving element transmitting drive to a driven element, a torque unit adapted to receive driving torque from a driving engine, and clutch elements individually related to a transmission element, whereby the torque unit is adapted by radial displacement of individual clutch elements to engage either of the transmission elements in accordance with the determination of its relative position by a locating unit.

11. In a variable transmission means, transmission elements each adapted to constitute a driving element transmitting drive to a driven element, individual engagement means each related to a transmission element and adapted to engage that transmission in the drive to the driven element, a torque unit axially of transmission elements adapted to receive driving torque from a driving engine and on rotation by the driving engine to contact with and cause engagement of either transmission element through radial displacement of its individual engagement means, and a locating unit adapted to determine the selection of the transmission element for contact and engagement through its individual engagement means.

12. A drive element adapted to receive driving torque from an engine, a control unit receiving torque from the drive element, transmission elements in axial alignment with the control unit, individual clutch engagement means each related to a transmission element and adapted by radial displacement to engage that transmission element in the drive to a driven element, and a locating unit adapted to determine the relative location of the control unit relative to the individual clutch engagement means for the determination of the engagement of the control unit through an individual clutch engagement means with a transmission element.

13. A drive element adapted to receive driving torque from an engine, a control unit receiving torque from the drive element, transmission elements in axial alignment with the control unit, individual clutch engagement means each related to a transmission element and adapted by radial displacement to engage that transmission element in the drive to a driven element, a locating unit having a series of control steps each adapted to determine the relative location of the control unit to the individual clutch engagement means for the determination of the engagement of the control unit through an individual clutch engagement means with a transmission element.

14. A drive element adapted to receive driving torque from an engine, a clutch between the drive element and the engine, a control unit receiving torque from the drive element, transmission elements in axial alignment with the control unit, individual engagement means each related to a transmission element and adapted to engage that transmission element in the drive to a driven element, a locating unit having a series of control steps each adapted to determine the relative location of the control unit to the individual engagement means for the determination of the engagement of the control unit through an individual engagement means with a transmission element, a manual selection unit having yieldable means interposed between it and the locating unit for the yieldable movement of the locating unit, and a releasing means correlated with the clutch between the drive element and the engine for the restriction of movement of the locating unit by the yieldable means except on partial or full disengagement of the clutch between the drive element and the engine.

15. In a variable transmission, transmission sets each having roller engagement means, a drive shaft, a driven shaft, a control unit adaptable to engage either transmission set by radial displacement of its roller engagement means under movement relatively in the transmission, and supplementary control means forming clutching means between the drive shaft and transmission and limiting also the movement of the control unit relatively according to its location.

16. In a variable transmission, transmission sets, a drive shaft, a main shaft, a driven shaft, roller engagement elements related to each transmission set and adapted by radial displacement to form engagement between its related transmission set and the main shaft, cams upon the drive shaft adapted successively to locate the roller engagement means in engagement position, and supplementary control means forming engagement between the drive shaft and main shaft in successive positions.

17. A drive element adapted to receive driving torque from an engine, a control unit receiving torque from the drive element, transmission elements in axial alignment with the control unit, individual clutch engagement means each related to a transmission element and adapted to engage that transmission element in the drive to a driven element through exertion of actuating power by the control unit, a locating unit having a series of control steps each adapted to determine the relative location of the control unit to the individual clutch engagement means for the determination of the engagement of the control unit through an individual clutch engagement means with a transmission element.

In witness whereof I have hereunto set my hand this 6th day of November, 1926.

ADOLPHE C. PETERSON.